United States Patent
Takayanagi

(10) Patent No.: US 6,501,560 B1
(45) Date of Patent: Dec. 31, 2002

(54) IMAGE DUPLICATING APPARATUS AND STORAGE MEDIUM

(75) Inventor: Toshihiro Takayanagi, Okazaki (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/466,984

(22) Filed: Dec. 17, 1999

(30) Foreign Application Priority Data

Dec. 17, 1998 (JP) ............................................. 10-358509

(51) Int. Cl.⁷ ............................................... G06K 15/00
(52) U.S. Cl. ........................................ 358/1.16; 358/1.1
(58) Field of Search ................................. 358/1.1, 1.16, 358/1.13, 1.14, 1.17, 1.18, 296, 404, 444, 540; 345/530, 536, 537, 538, 544, 545, 546; 710/52, 53, 74

(56) References Cited

U.S. PATENT DOCUMENTS 6,226,099 B1 * 5/2001 Sugaya ....................... 358/1.15
6,369,910 B1 * 4/2002 Mitani ........................ 358/1.13

FOREIGN PATENT DOCUMENTS

| JP | A-57-58166 | 4/1982 |
| JP | 63-260263 | 10/1988 |
| JP | 1-195582 | 8/1989 |
| JP | 2-92069 A | 3/1990 |
| JP | 2-137469 | 5/1990 |
| JP | 3-64165 | 3/1991 |
| JP | A-10-79822 | 3/1998 |

* cited by examiner

Primary Examiner—Arthur G. Evans
(74) Attorney, Agent, or Firm—Oliff & Berridge, PLC

(57) ABSTRACT

The invention provides an image duplicating apparatus capable of performing duplicating operations with its whole operation time shortened by the simple speed adjustments, without increasing the size of the memory as much as possible and its costs. When images are duplicated, for example, at full scale, a CPU starts executing the input/output processing of the image line data. The image line data is written into a line buffer memory and at least one line of the image line data written in the line buffer memory is retained. Upon the receipt of the data output request from the printing unit, the CPU reads out the image line data retained in the line buffer memory and outputs it to the printing unit. The CPU repeatedly performs the above-described steps. The duplicating operations may be performed with the space for storing at least two lines of the image line data secured in the line buffer memory.

24 Claims, 2 Drawing Sheets

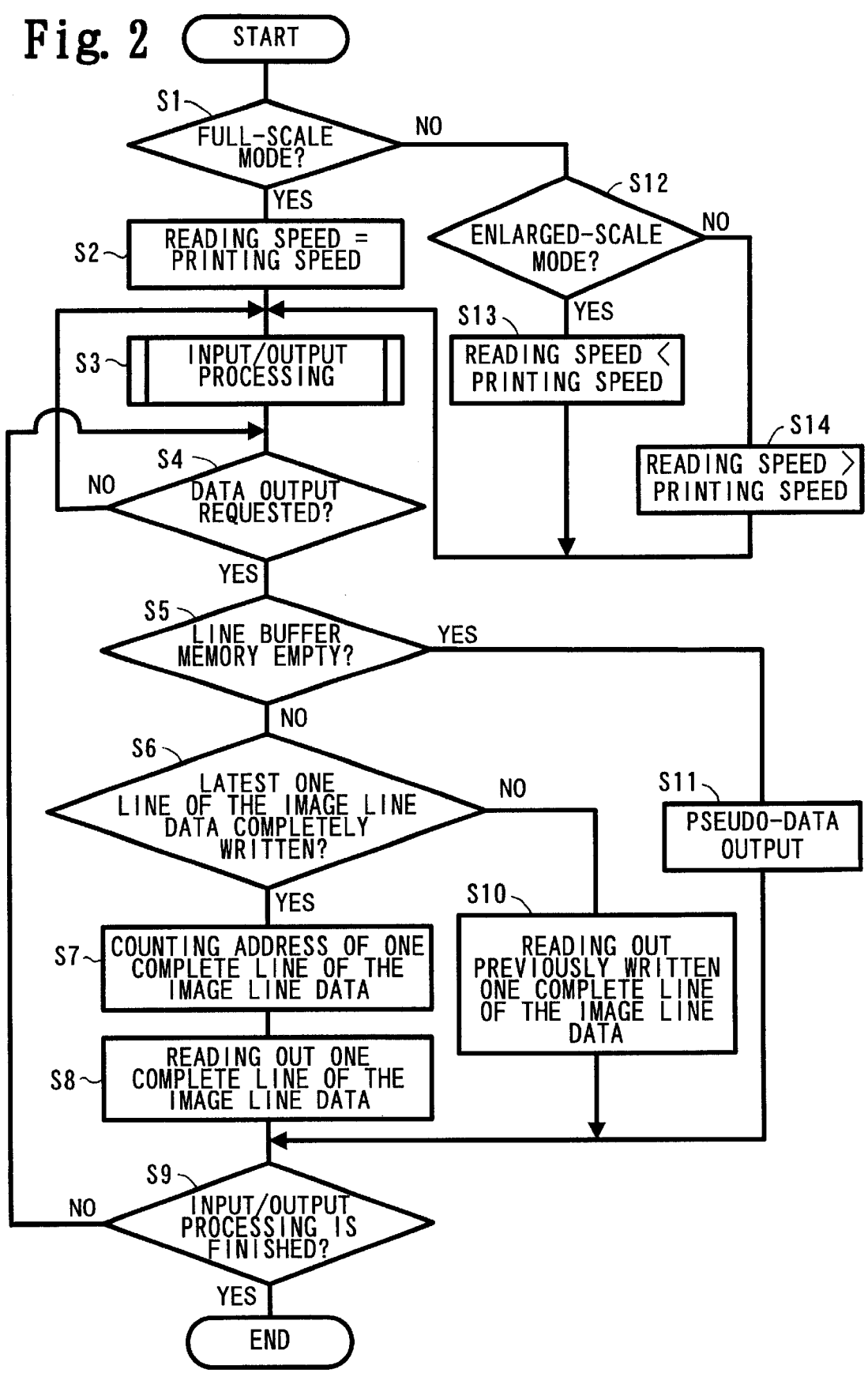

IMAGE DUPLICATING APPARATUS AND STORAGE MEDIUM

BACKGROUND OF THE INVENTION

1. Field of Invention

The invention relates to an image duplicating apparatus having such as a laser printer mechanism and to a storage medium that stores programs for controlling the image duplicating apparatus.

2. Description of Related Art

Currently, some facsimile machines have duplicating functions to duplicate original images onto a recording paper, similar to office-use copying machines, in addition to the ordinary facsimile functions to send and receive the facsimile images. In such facsimile machines having the duplicating functions, the laser printer mechanism is being adopted instead of the thermal printer mechanism to meet the demands for printing speed.

The facsimile machines that perform duplicating using the laser printer type, include a line image sensor that reads images on a document line-by-line in the main -scanning direction while the document is being conveyed, and a laser printer mechanism that consecutively transfers toner images in the sub scanning direction, onto a recording paper to be discharged thereafter. In the above-described structure, the printing speed by the laser printer mechanism tends to be faster than the reading speed of the line image sensor. Therefore, a page memory capable of storing image data for one page is mounted on the facsimile machine so that the input/output processing of the image data can be performed between the line image sensor and the laser printer mechanism.

In some of other facsimile machines having the printer mechanism other than laser printer, the reading operation and printing operation are controlled so that they are synchronized according to the image data stored in a memory. For example, when any image data is not stored in the memory, the printing operation is temporarily stopped until the image data is stored in the memory to a certain extent (amount). After the image data is stored in the memory to a certain extent, the printing operation is started again, as linked with the reading operation.

However, the conventional facsimile machines having duplicating functions using the laser printer type need to have a page memory capable of storing the image data for one page due to the difference between the reading and printing speeds. If the size of the memory is increased, its cost is increased accordingly.

The conventional facsimile machines that have a printer mechanism other than a laser printer that control the reading and printing operations so that they are synchronized, the input/output processing of the image data may be performed via a memory with the smaller size than the page memory. Therefore, the problems with respect to the increase in the costs of the memory will be settled. However, complicated adjustments are required for controlling the reading and printing operations. In addition, the downtime in which the printing operation is not performed or is interrupted, is generated during the time in which the images are read from an original and are formed onto the recording paper. Therefore, the time required for the whole duplicating processing will not be shortened due to the downtime or the interruption of the printing operation, even though the printing operation does not take as much time when the image data is stored in the memory and the printing operation is not interrupted.

SUMMARY OF THE INVENTION

One aspect of the invention is to provide an image duplicating apparatus capable of performing the duplicating operation with its whole operation time shortened by the simple speed adjustments, without increasing the size of the memory as much as possible and its costs. Another aspect of the invention is to provide a storage medium that stores programs for controlling the image duplicating apparatus.

According to one aspect of the invention, there is provided an image duplicating apparatus having an image reading device that reads images from an original line-by-line in the main scanning direction and a printing device that consecutively forms the images line-by-line onto a recording paper in the sub scanning direction. The image duplicating apparatus performs input/output processing between the image reading device and the printing device via a memory to duplicate the images read from the original onto a recording paper. The image duplicating apparatus includes a line data writing controlling device that writes the image line data obtained from the image reading device after having the input processing, line-by-line, into the memory and that retains at least one line of the image line data in the memory, a written line information obtaining device that obtains the written line information as to the condition of at least two lines of the image line data written into the memory by the line data writing controlling device, and a line data reading controlling device that reads out the one complete line of the image line data from the memory upon the receipt of the data output request from the printing device, referring to the written line information obtained by the written line information obtaining device and outputs the image line data to the printing device.

In the image duplicating apparatus, the image line data is written into the memory line-by-line, and at least one line of the image line data is retained in the memory. The one complete line of the image line data is read out from the memory and is used for printing processing. Therefore, the image duplicating apparatus does not have to have a page memory capable of storing the image data for one page, but the input/output processing may be performed though a memory into which at least two lines of the image line data can be written or from which it can be read out. Consequently, the size of the memory mounted on the image duplicating apparatus is not increased as much as possible, and also its costs are not increased. Even when the time required to print one line of the image line data is shorter than that required to read one line of the image data, that is, when the cycle of reading the image line data from the line buffer memory is faster than that of writing the image line data thereinto, the one complete line of the image line data will always be retained in the memory except at the start of the duplicating operations. Therefore, the printing operations may be performed without any stops or interruption during the duplicating operations, and the time required for the duplicating operations can be shortened without the printing and reading time for one line of the image line data being adjusted.

Also in the invention, the speed of reading the images line-by-line in the main scanning direction by the image reading device (conveying the original document) and the speed of consecutively forming images line-by-line in the sub scanning direction by the printing device (conveying a recording medium), are adjusted so that they become equal.

Since the reading and printing speeds are adjusted so that they become equal, the images obtained by reading from the original line-by-line in the main scanning direction, are formed onto a recording paper in the sub scanning direction approximately at fall scale.

Further in the invention, the speed of reading the images line-by-line in the main scanning direction by the image reading device and the speed of consecutively forming images line-by-line in the sub scanning direction by the printing device, are adjustable so that they are relatively varied.

Since the reading and printing speeds are adjustable so that they are relatively varied, the images obtained by reading from the original line-by-line in the main scanning direction, are formed onto the recording paper while being enlarged or reduced in the sub scanning direction.

In the image duplicating apparatus of the invention, when the result that any complete line of the image line data does not exist in the memory, is obtained by referring to the written line information obtained by the written line information obtaining device, upon the receipt of the data output request from the printing device, the line data reading controlling device outputs pseudo-data for the image line data.

Even when any complete line of the image line data does not exist in the memory, the printing processing may be performed based on the pseudo-data instead of the image line data. At the start of the duplicating processing, one complete line of the image line data has not been yet written into the memory. However, the printing processing is performed based on the pseudo-data until one line of the image line data is completely written into the memory. Therefore, the duplicating processing is performed effectively without the printing processing being stopped or interrupted.

According to another aspect of the invention, there is provided a storage medium that stores programs for controlling an image duplicating apparatus having an image reading device that reads images from an original line-by-line in the main scanning direction and a printing device that consecutively forms the images line-by-line onto a recording paper in the sub scanning direction, and performing input/output processing between the image reading device and the printing device via a memory to duplicate the images read from the original onto a recording paper. The storage medium may include a line data writing controlling program for writing the image line data obtained from the image reading device after having the input processing, line-by-line into the memory and for retaining at least one line of the image line data in the memory, a written line information obtaining program for obtaining the written line information as to the condition of at least two lines of the image line data written into the memory based on the line data writing controlling program, and a line data reading controlling program for reading out the one complete line of the image line data from the memory upon the receipt of the data output request from the printing device, referring to the written line information obtained based on the written line information obtaining program and for outputting the image line data to the printing device.

By activating the CPU based on the stored program, the image duplicating apparatus of the invention can be realized.

BRIEF DESCRIPTION OF THE DRAWINGS

A preferred embodiment of the present invention will be described in detail with reference to the following figures wherein:

FIG. 2 is a flowchart illustrating duplicating operations executed by a CPU of the facsimile machine.

Figure 1:
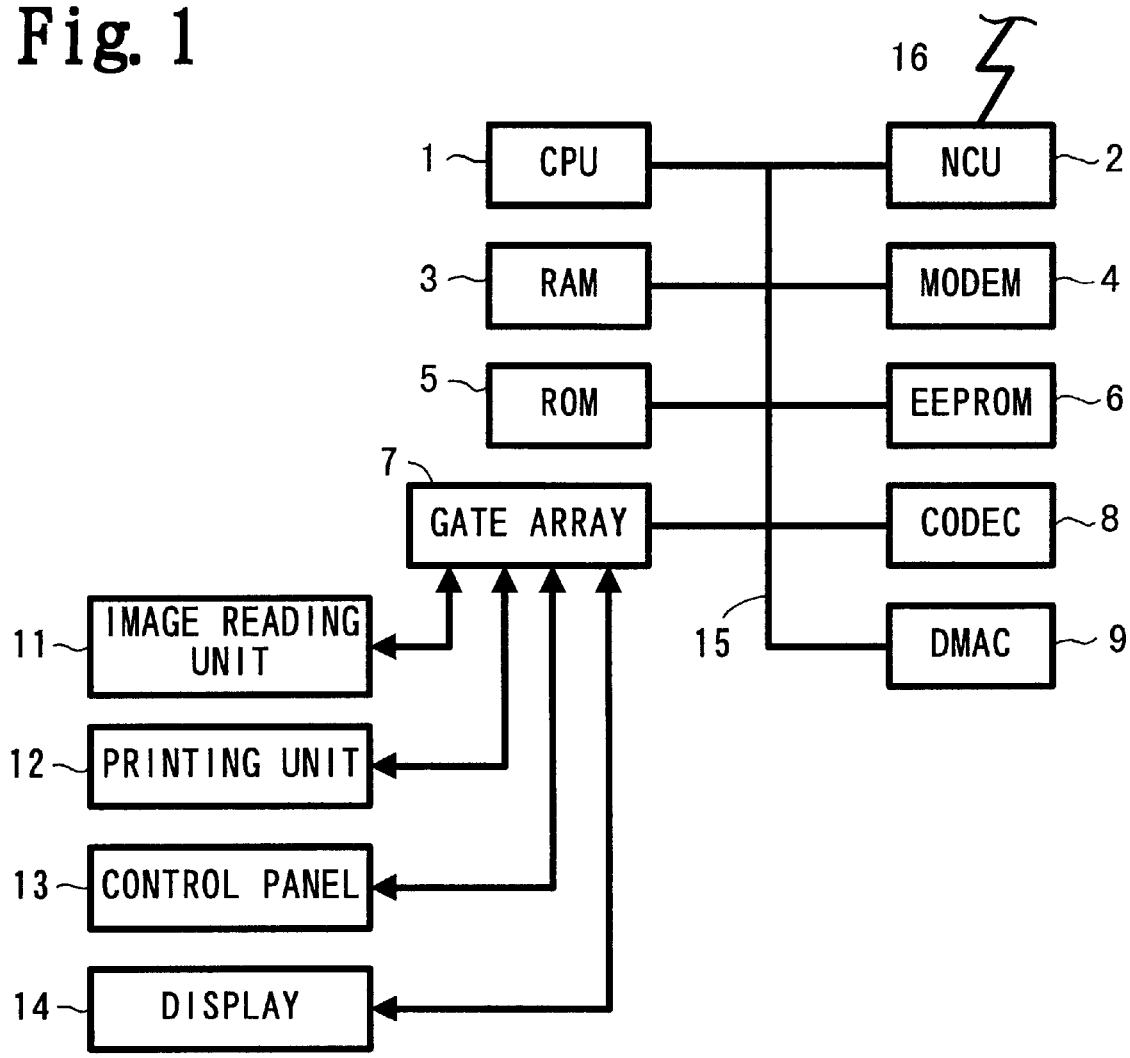
FIG. 1 is a block diagram of an facsimile machine that may be used as an image duplicating apparatus according to an embodiment of the invention.

Further objects, details, and advantages of the invention will be apparent from the following detailed description, when read in conjunction with the drawings.

DETAILED DESCRIPTION OF PREFERRED EMBODIMENTS

A preferred embodiment of the invention will be described in detail with reference to the figures.

FIG. 1 is a block diagram of an facsimile machine that may be used as an image duplicating apparatus according to an embodiment of the invention. In addition to the ordinary facsimile functions to send and receive the facsimile images, the facsimile machine has duplicating functions to duplicate images onto a recording paper, similar to office-use copying machines.

As shown in FIG. 1, the facsimile machine includes a central processing unit (CPU) 1, a network control unit (NCU) 2, a random-access memory (RAM) 3, a modem 4, a read-only memory (ROM) 5, an electrically erasable programmable read-only memory (EEPROM) 6, a gate array 7, a CODEC 8, a direct memory access controller (DMAC) 9, an image reading unit 11, a printing unit 12, a control panel 13, and a display 14. The CPU 1, the NCU 2, the RAM 3, the modem 4, the ROM 5, the EEPROM 6, the gate array 7, the CODEC 8, and the DMAC 9 are connected with each other by a bus line 15. The bus line 15 includes an address bus, a data bus, and a control signal line. The image reading unit 11, the printing unit 12, the control panel 13, and the display 14 are connected to the gate array 7. A public telephone line 16 is connected to the NCU 2.

The CPU 1 controls the operations of the facsimile machine. The NCU 2 connected to the public telephone line 16, performs the network controls. The back-up battery of the RAM 3 maybe for example, charging battery, and the RAM 3 provides spaces for the operations by the CPU 1 and for storing various kinds of data. The modem 4 modulates and demodulates facsimile data. The ROM 5 stores various kinds of programs and data, such as setting values. The EEPROM 6 stores various kinds of flags and setting data. The gate array 7 functions as an input/output interface of the CPU 1. An A/D converting circuits (not shown) for inputting/outputting data when duplicating is performed, and a line buffer memory (not shown) are incorporated into the gate array 7. The CODEC 8 encodes and decodes the facsimile data. The DMAC 9 writes data into and reads data from the RAM 3 or the line buffer memory.

The image reading unit 11 has a light source and an image sensor. The images are read line-by-line from a transferring original in the main scanning direction to generate the image line data. The printing unit 12 has a printer mechanism of a laser printer type, wherein a laser beam scans across the surface of the photoconductive drum, the drum picks up toner and deposits it line-by-line onto a recording paper consecutively while the paper is making contacts with the drum and being transferred in the sub scanning direction. Thus, the images are formed and printed. The control panels 13 has various keys and outputs input signals according to the inputs by the key operations by a user. The display 14 has a liquid crystal display (LCD) for displaying various information such as characters and figures. The display 14 indicates, for example, operation conditions of the facsimile machine.

The main points of the invention will be briefly explained below. The facsimile machine according to the invention may perform the duplicating operations in cooperation mainly with a line image sensor and a printer mechanism. For duplication, the image line data is input/output between the image reading unit 11 and the printing unit 12, via a line buffer memory. The line buffer memory, for example, is capable of storing at least two lines of the image line data and is adopted for the facsimile machine. The printing speed in the printing unit 12 is fixed. The reading speed in the image reading unit 11 is variable. When images are duplicated, for example, at full scale, the CPU 1 controls the reading speed so that it becomes equal to the printing speed. The reading speed refers to the amount of an original to be fed in the sub scanning direction per unit time. The printing speed refers to the amount of a recording paper to be fed in the sub scanning direction per unit time when images are printed onto a recording paper. The reading and printing time for one line in the sub scanning direction is fixed. In this embodiment, one line of the image line data obtained by reading the images from the original, is printed onto the recording paper five times when images are duplicated, for example, at full scale. In this case, the data output is requested at a cycle such that the number of printing times and lines in the sub scanning direction, becomes 5 times as much as the number of reading times and lines in the sub scanning direction, respectively when the feeding amount of the original and the recording paper is the same. When the images are duplicated at enlarged or reduced scale, the data output is requested constantly, similar to the fullscale duplication and the CPU 1 adjusts, that is, reduces or increase the reading speed relative to the printing speed.

The CPU 1 obtains the image line data which had the input processing, such as correction from the image reading unit 11, and writes the image line data line-by-line into the line buffer memory. The CPU 1 retains at least one line of the written image line data in the line buffer memory. The CPU 1 obtains the written line information as to the condition of two lines of the image line data written into the line buffer memory. The written line information is obtained based on the address generated when the image line data is written into the line buffer memory. The CPU 1 receives the request to output the image line data line-by-line, from the printing unit 12 at a constant cycle. Referring to the written line information upon the receipt of the data output request, the CPU 1 reads out one complete line of the image line data from the line buffer memory and outputs it to the printing unit 12. By making the reading and printing speeds equal for the full-scale duplication, the image line data obtained by reading the images from the original is output according to the data output request from the printing unit 12, and the full-scale images are formed onto the recording paper in the sub scanning direction.

For example, when the images are duplicated at enlarged scale, the data output is requested constantly, similar to the full-scale duplication. The ratio of the number of printing times to the number of reading times in the sub scanning direction, is the same (5:1) as when the images are duplicated at fall scale. For the enlarged-scale duplication, the reading speed is reduced relative to the printing speed, so that images may be read at the resolution higher than when they are read for the full-scale duplication.

In other words, when the images are duplicated at enlarged scale, the reading range in the sub scanning direction becomes small due to the reduction of the reading speed, relative to the printing range or the fixed number of lines (5 lines) printed in the sub scanning direction.

Therefore, the images enlarged in the sub scanning direction are formed onto a recording paper. On the contrary, when the images are duplicated at reduced scale, the reading range in the sub scanning direction becomes wide relative to the printing range in the sub scanning direction, due to the increase in the reading speed, so that the images reduced in the sub scanning direction are formed onto a recording paper.

The CPU 1 realizes a line data writing controlling device that writes the image line data obtained from the image reading device after having the input processing, line-by-line, into the memory. The line data writing controlling device retains at least one line of the written image line data in the line buffer memory. The CPU 1 also realizes a written line information obtaining device that obtains the written line information as to the condition of at least two lines of the image line data written into the memory by the line data writing controlling device. The CPU 1 further realizes a line data reading controlling device that reads out one complete line of the image line data from the memory when the data output request from the printing device is received, referring to the written line information obtained by the written line information obtaining device and outputs the image line data to the printing device.

The ROM 5 includes an image reading device that reads images from an original line-by-line in the main scanning direction, and a printing device that forms the images consecutively onto a recording paper in the sub scanning direction using the image line data. The ROM 5 is a storage medium that stores programs for controlling the image duplicating apparatus that duplicates the images read from an original onto a recording paper while performing the inputting/outputting processing of the image line data between the image reading device and the printing device via the memory. The ROM 5 realizes a storage medium that stores programs including a line data writing controlling program, a written line information obtaining program, and a line data reading controlling program. The line data writing controlling program is for writing the image line data obtained from the image reading device after having the input processing, line-by-line into the memory, and for retaining at least one line of the written image line data in the memory. The written line information obtaining program is for obtaining the written line information as to the condition of the two lines of the image line data written into the memory. The line data reading controlling program is for reading out one complete line of the image line data from the memory when the data output request from printing device is received, referring to the written line information obtained based on the written line information obtaining program and for outputting the image line data to the printing device.

The duplicating operations performed by the facsimile machine having the above-described structures are described below with reference to FIG. 2.

FIG. 2 is a flowchart illustrating duplicating operations executed by a CPU 1 of the facsimile machine. As shown in FIG. 2, the CPU 1 determines at the start of the duplicating processing whether or not the setting duplicating mode is a full-scale mode (S1).

When the setting duplicating mode is the full-scale mode (YES in S1), the CPU 1 makes the reading and printing speeds equal (S2) by controlling each paper feeding motor for an original to be read and a recording paper on which images are duplicated.

Then, the CPU 1 executes the input/output processing of the image line data between the image reading unit 11 and the printing unit 12, via the line buffer memory (S3). As for the input processing, such as A/D converting and interpolating (explained below) are performed for the analog image signals obtained by the line image sensor of the image reading unit 11. The image line data is generated line-byline and is written into the line buffer memory. As for the output processing, one line of the image line data is read out from the line buffer memory as a print data, according to the data output request from the printing unit 12. The image line data is line-by-line written into or read from the line buffer memory having the spaces for storing each of two lines of image line data.

When the data output is requested by the printing unit 12 (YES in S4), the CPU 1 determines whether or not the line buffer memory is empty (S5). The conditions that line buffer memory is empty include the conditions where any image line data has not written in the line buffer memory or less than one line of the image line data has been written into the line buffer memory. Such conditions may occur when the printing operation is started before the reading operation is started. To prevent such condition from occurring, the printing operation is normally started at a predetermined time after the reading operation is started. The data output is requested by the printing unit 12 a the predetermined time interval, every time the printing operation for one line of the image line data is finished.

When the CPU 1 determines that the line buffer memory is not empty (NO in S5), the CPU 1 then determines whether the latest one line of the image line data is completely written into the line buffer memory (S6), referring to the address generated when the image line data is written into the memory.

When the latest one line of the image line data is completely written into the line buffer memory (YES in S6), the CPU 1 starts counting the address of the latest one complete line of the image line data from the start (S7), and reads out that image line data from the start of the address (S8). Then, the latest one complete line of the image line data has corrections with respect to, for example, shading, and is output to the printing unit 12. In the printing unit 12, images are consecutively formed line-byline onto a recording paper based on the image line data. The CPU 1 determines that the image line data is finished being read out when the CPU 1 counts the end of the address of the one line of the image line data.

Thereafter, the CPU 1 determines whether input/output processing is finished (S9) based on the signals from the sensor which detects the end of the paper. When it is determined that input/output processing is finished (YES in S9), the program for the duplicating processing is finished being executed. The steps S4 to S9 are performed within the instantaneous cycle time.

When the input/output processing is not finished (NO in S9) but is continued, the flow returns to S4 and the CPU 1 determines whether the data output is requested by the printing unit 12.

In the step S6, when the latest one line of the image line data is not completely written into the line buffer memory (NO in S6), the CPU 1 reads out the previously written one complete line of the image line data from the line buffer memory (S10). Then, the image are formed in the printing unit 12 based on the previously written one complete line of the image line data read out from the line buffer memory, and the flow may return to the step S4, via the step S9.

In the step S5, when the CPU 1 determines that the line buffer memory is empty (YES in S5), the CPU 1 outputs pseudo-data similar to when white images are printed. More specifically, the data (OOH), such that cause no toner images to be formed onto a recording paper, is output to the printing unit 12 (S11). Thereafter, the flow may return to the step S4, via the step S9.

In the step S4, the data output is not requested by the printing unit 12 (NO in S4), the flow returns to step S3 and CPU 1 continues the input/output processing. At this time, the image line data obtained from the image reading unit 11 is written into the line buffer memory, and the previously written one complete line of the image line data is read out from the line buffer memory.

When the setting duplicating mode is not the full-scale duplicating mode (NO in SI), the CPU 1 determines whether the setting duplicating mode is the enlarged-scale mode (S 12).

When it is determined that the setting duplicating mode is the enlarged-scale mode (YES in S12), the CPU 1 makes the reading speed slower than the printing speeds (SI 3) by controlling each paper feeding motor for an original to be read and a recording paper on which images are duplicated. The ratio of the reading speed reduction with respect to the printing speed is determined based on the scaling factor for the duplication of the images. For example, when the images are scaled up 2 times, the reading speed is reduced approximately by half of the printing speed. The input/output processing is performed in the step 3 by the reading speed controlled by the CPU 1. In this case, the reading range in the sub scanning direction becomes small relative to the printing range in the sub scanning direction due to the reduction of the reading speed, so that the images enlarged in the sub scanning direction are formed onto a recording paper.

When it is determined that the setting duplicating mode is not the enlargedscale duplicating mode (NO in S12), the CPU 1 makes the reading speed faster than the printing speeds (S 14) by controlling each paper feeding motor for an original to be read and a recording paper on which images are duplicated.

The ratio of the reading speed speedup with respect to the printing speed is determined based on the scaling factor. For example, when the images are scaled down to half, the reading speed is increased approximately twice as fast as the printing speed. The input/output processing is performed in the step S3 by the reading speed controlled by the CPU 1. In this case, the reading range in the sub scanning direction becomes wide relative to the printing range in the sub scanning direction due to the increase in the reading speed, so that the images reduced in the sub scanning direction are formed onto a recording paper.

In the facsimile machine that has the above-described structures and that performs the above-described operations, the image line data is written into the line buffer memory line-by-line, and at least one line of the image line data is retained in the memory. One complete line of the image line data is read out from the line buffer memory and is used for printing processing. Therefore, the facsimile machine does not have to have a page memory capable of storing the image data for one page, but the input/output processing may be performed through a line buffer memory into which at least two lines of the image line data can be written or from which it can be read out. Consequently, the size of the memory mounted on the facsimile machine is not increased as much as possible, and also its costs are not increased.

Even when the time required to print one line of the image line data is shorter than that required to read one line of the image data, that is, when the cycle of reading the image line data from the line buffer memory is faster than that of writing the image line data thereinto, the one complete line of the image line data will always be retained in the memory except at the start of the duplicating operations. Therefore, the printing operations using the laser printer type, which are difficult to stop once the operations are started, may be performed without any stops or interruption during the duplicating operations, and the time required for the duplicating operations can be shortened without the printing and reading time for one line of the image line data being synchronized with each other.

As is apparent from the foregoing description, in an image duplicating apparatus of the invention, the image line data is written into the memory line-by-line, and at least one line of the image line data is retained in the memory. The one complete line of the image line data is read out from the memory and is used for printing processing. Therefore, the image duplicating apparatus does not have to have a page memory capable of storing the image data for one page, but the input/output processing may be performed though a memory into which at least two lines of the image line data can be written or from which it can be read out. Consequently, the size of the memory mounted on the image duplicating apparatus is not increased as much as possible, and also its costs are not increased. Even when the time required to print one line of the image line data is shorter than that required to read one line of the image data, that is, when the cycle of reading the image line data from the line buffer memory is faster than that of writing the image line data thereinto, the one complete line of the image line data will always be retained in the memory except at the start of the duplicating operations. Therefore, the printing operations may be performed without any stops or interruption during the duplicating operations, and the time required for the duplicating operations can be shortened without the printing and reading time for one line of the image line data being adjusted.

Also in the invention, since the reading and printing speeds are adjusted so that they become equal, the images obtained by reading from the original line-by-line in the main scanning direction, are formed onto a recording paper in the sub scanning direction approximately at full scale.

Further in the invention, since the reading and printing speeds are adjustable so that they are relatively varied, the images obtained by reading from the original line-by-line in the main scanning direction, are formed onto the recording paper while being enlarged or reduced in the sub scanning direction.

In the image duplicating apparatus of the invention, even when any complete line of the image line data does not exist in the memory, the printing processing may be performed based on the pseudo-data instead of the image line data. At the start of the duplicating processing, one complete line of the image line data has not been yet written into the memory. However, the printing processing is performed based on the pseudo-data until one line of the image line data is completely written into the memory. Therefore, the duplicating processing is performed effectively without the printing processing being stopped or interrupted.

By activating the CPU based on the stored program, the image duplicating apparatus of the invention can be realized.

While the invention has been described with reference to the embodiments, it is to be understood that the invention is not restricted to the particular forms shown in the foregoing embodiments. Various modifications and alternations can be made thereto without departing from the scope of the invention.

What is claimed is:

1. An image duplicating apparatus, comprising:
   an image reading device that reads images from an original line-by-line in the main scanning direction;
   a printing device that consecutively forms the images line-by-line onto a recording paper in the sub scanning direction, the image duplicating apparatus performing input/output processing between the image reading device and the printing device via a memory to duplicate the images read from the original onto the recording paper;
   a line data writing controlling device that writes image line data obtained from the image reading device line-by-line into the memory, and retains at least one line of the image line data in the memory;
   a written line information obtaining device that obtains the written line information as to the condition of at least two lines of the image line data written into the memory by the line data writing controlling device; and
   a line data reading controlling device that reads out one complete line of the image line data from the memory upon the receipt of a data output request from the printing device, based on the written line information obtained by the written line information obtaining device, and outputs the image line data to the printing device.

2. The image duplicating apparatus according to claim 1, wherein the speed of reading the images line-by-line in the main scanning direction by the image reading device and the speed of consecutively forming images line-by-line in the sub scanning direction by the printing device, are adjusted so that they become equal.

3. The image duplicating apparatus according to claim 2, wherein when the reading and printing speeds are adjusted so that they become equal, the printing device forms images obtained by reading from the original line-by-line in the main scanning direction, onto the recording paper in the sub scanning direction at approximately full scale.

4. The image duplicating apparatus according to claim 1, wherein the speed of reading the images line-by-line in the main scanning direction by the image reading device and the speed of consecutively forming images line-by-line in the sub scanning direction by the printing device, are adjustable so that they are relatively varied.

5. The image duplicating apparatus according to claim 4, wherein when the reading and printing speeds are adjustable so that they are relatively varied, the printing device forms the images obtained by reading from the original line-by-line in the main scanning direction, onto the recording paper while being enlarged or reduced in the sub scanning direction.

6. The image duplicating apparatus according to claim 1, wherein when the result that any complete line of the image line data does not exist in the memory, is obtained based on the written line information obtained by the written line information obtaining device, upon the receipt of the data output request from the printing device, the line data reading controlling device outputs pseudo-data for the image line data.

7. The image duplicating apparatus according to claim 6, wherein printing processing is performed based on the pseudo-data and not the image line data.

8. The image duplicating apparatus according to claim 7, wherein printing processing is performed based on the pseudo-data until one line of the image line data is completely written into the memory.

9. An image duplicating method, comprising:
  reading images from an original line-by-line in the main scanning direction using an image reading device;
  consecutively forming the images line-by-line onto a recording paper in the sub scanning direction using a printing device;
  performing input/output processing between the image reading device and the printing device via a memory to duplicate the images read from the original onto the recording paper;
  writing image line data obtained from the image reading device line-by-line into the memory;
  retaining at least one line of the image line data in the memory;
  obtaining the written line information as to the condition of at least two lines of the image line data written into the memory in the writing step; and
  reading out one complete line of the image line data from the memory upon the receipt of a data output request from the printing device, based on the written line information obtained in the obtaining step; and
  outputting the image line data to the printing device.

10. The image duplicating method according to claim 9, further comprising:
  adjusting the speed of reading the images line-by-line in the main scanning direction by the image reading device and the speed of consecutively forming images line-by-line in the sub scanning direction by the printing device, so that they become equal.

11. The image duplicating method according to claim 10, wherein when the reading and printing speeds are adjusted so that they become equal, the printing device forms images obtained by reading from the original line-by-line in the main scanning direction, onto the recording paper in the sub scanning direction at approximately full scale.

12. The image duplicating method according to claim 9, further comprising:
  adjusting the speed of reading the images line-by-line in the main scanning direction by the image reading device and the speed of consecutively forming images line-by-line in the sub scanning direction by the printing device, so that they are relatively varied.

13. The image duplicating method according to claim 12, wherein when the reading and printing speeds are adjustable so that they are relatively varied, the printing device forms the images obtained by reading from the original line-by-line in the main scanning direction, onto the recording paper while being enlarged or reduced in the sub scanning direction.

14. The image duplicating method according to claim 9, wherein when the result that any complete line of the image line data does not exist in the memory, is obtained based on the written line information obtained in the obtaining step, upon the receipt of the data output request from the printing device, the outputting step outputs pseudo-data for the image line data.

15. The image duplicating method according to claim 14, wherein printing processing is performed based on the pseudo-data and not the image line data.

16. The image duplicating method according to claim 15, wherein printing processing is performed based on the pseudo-data until one line of the image line data is completely written into the memory.

17. A storage medium that stores programs for controlling an image duplicating apparatus, comprising:
  an image reading program for reading images from an original line-by-line in the main scanning direction using an image reading device;
  a printing program for consecutively forming the images line-by-line onto a recording paper in the sub scanning direction using a printing device;
  an input/output processing program for performing input/output processing between the image reading program and the printing program via a memory to duplicate the images read from the original onto the recording paper;
  a line data writing controlling program for writing the image line data obtained from the image reading device after having the input processing, line-byline, into the memory, and for retaining at least one line of the image line data which has been completely written in the memory;
  a written line information obtaining program for obtaining the written line information as to the condition of at least two lines of the image line data written into the memory based on the line data writing controlling program; and
  a line data reading controlling program for reading out the one complete line of the image line data from the memory upon the receipt of the data output request from the printing device, based on the written line information obtained based on the written line information obtaining program, and for outputting the image line data to the printing device.

18. The storage medium according to claim 17, further comprising:
  a program for adjusting the speed of reading the images line-by-line in the main scanning direction by the image reading device and the speed of consecutively forming images line-by-line in the sub scanning direction by the printing device, so that they become equal.

19. The storage medium according to claim 18, wherein when the reading and printing speeds are adjusted so that they become equal, the printing device forms images obtained by reading from the original line-by-line in the main scanning direction, onto the recording paper in the sub scanning direction at approximately full scale.

20. The storage medium according to claim 17, further comprising:
  a program for adjusting the speed of reading the images line-by-line in the main scanning direction by the image reading device and the speed of consecutively forming images line-by-line in the sub scanning direction by the printing device, so that they are relatively varied.

21. The storage medium according to claim 20, wherein when the reading and printing speeds are adjustable so that they are relatively varied, the printing device forms the images obtained by reading from the original line-by-line in the main scanning direction, onto the recording paper while being enlarged or reduced in the sub scanning direction.

22. The storage medium according to claim 17, wherein when the result -that any complete line of the image line data does not exist in the memory, is obtained based on the written line information obtained by the written line information program, upon the receipt of the data output request from the printing device, the line -data reading controlling program outputs pseudo-data for the image line data.

23. The storage medium according to claim 22, wherein printing processing is performed based on the pseudo-data and not the image line data.

24. The storage medium according to claim 23, wherein printing processing is performed based on the pseudo-data until one line of the image line data is completely written into the memory.

* * * * *